Oct. 30, 1945.                H. A. VALLEZ                2,388,194
      PROCESS FOR REFINING AND PURIFICATION OF SUGAR JUICES
                        Filed May 31, 1941
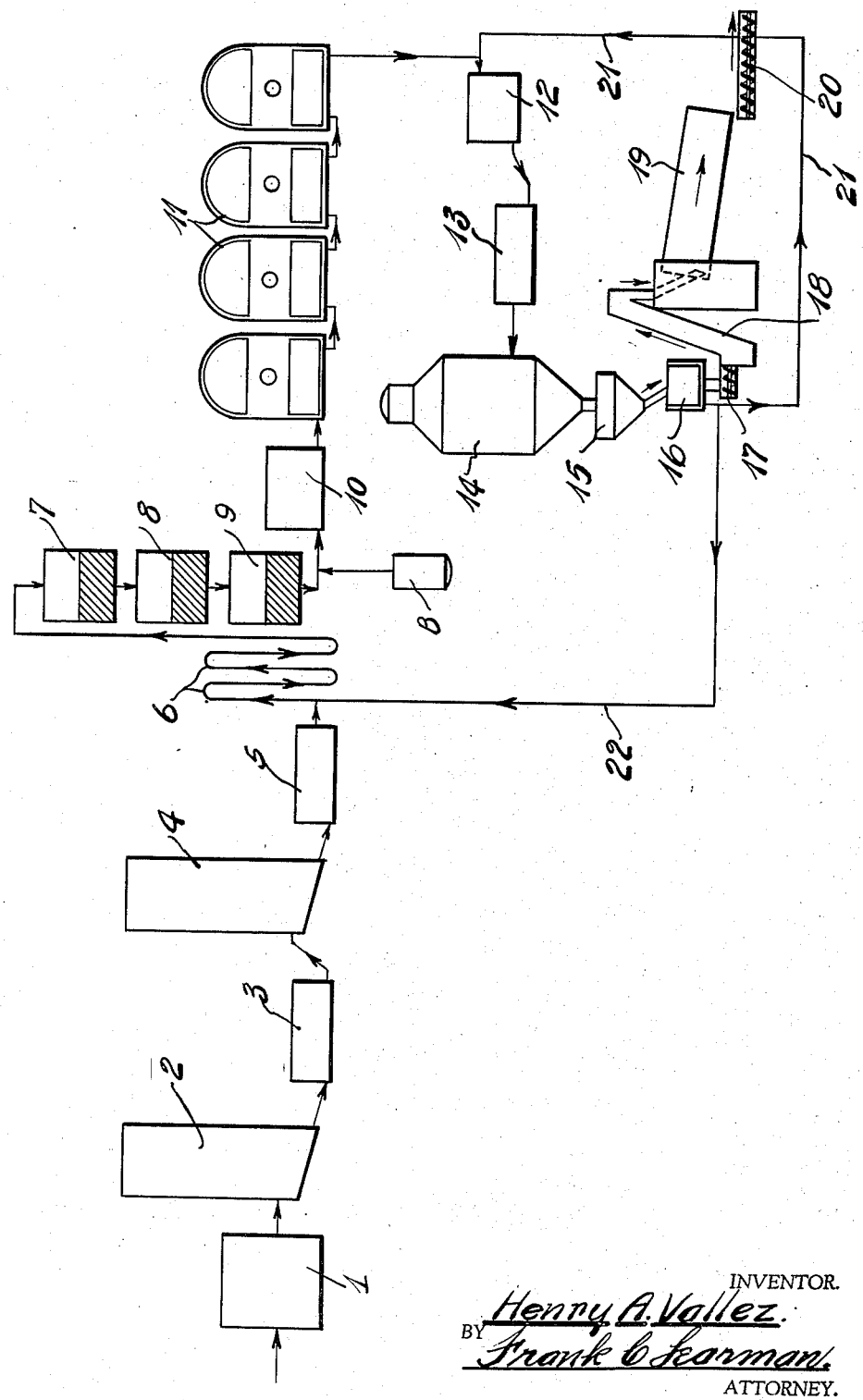
INVENTOR.
Henry A. Vallez.
BY Frank C. Searman.
ATTORNEY.

Patented Oct. 30, 1945

2,388,194

UNITED STATES PATENT OFFICE 2,388,194

PROCESS FOR REFINING AND PURIFICATION OF SUGAR JUICES

Henry A. Vallez, Bay City, Mich., assignor, by mesne assignments, to Infilco Incorporated, Chicago, Ill., a corporation of Delaware Application May 31, 1941, Serial No. 396,083

14 Claims. (Cl. 127—46)

This invention relates to an improved process of treating beet or cane sugar and more particularly to a method and apparatus for refining raw sugar juice in a manner wherein only one boiling is necessary, and with an apparatus that eliminates several expensive units which have heretofore been considered essential in sugar refining.

In the refining of beet sugar by processes customarily used heretofore the raw beet sugar juice ordinarily initially is limed and subjected to carbonation for the precipitation of substantial quantities of calcium carbonate. After filtration the raw sugar juice is subjected to a second carbonation and filtration to remove still further quantities of calcium carbonate. Although some impurities are removed by this process, the resulting sugar juice is highly impure and contains substantial quantities of organic non-sugars, as well as inorganic salts.

To further purify the juice before evaporation it has been customary heretofore to then treat the juice with sulfurous acid and filter it for the further removal of impurities. Even after these purification steps the raw sugar juice is so impure that upon evaporation the thick juice produces a relatively small yield of white sugar and a relatively large yield of mother liquor which generally is subjected to further steps including dilution, concentration, crystallization, and centrifuging. In other words, three boiling steps are necessary and the product from the last two crystallization steps is a brown sugar which must be melted and again introduced into the process, for such brown sugar is not suitable for admixture with the white sugar for such purposes as table use. Additionally, there is produced a molasses which contains substantial quantities of sugar which cannot be crystallized due to the quantities of organic and inorganic impurities contained therein.

The present process is designed to eliminate a number of the steps of the previously known processes and in addition to effect further economies and an increase in yield of sugar of a better quality than has been possible to recover heretofore.

In the accompanying drawing, which illustrates a typical application of the present invention to the manufacture of beet sugar, the numeral 1 indicates a conventional liming tank in which the diffusion juice initially is treated with lime to increase the pH of said juice and precipitate colloids and organic impurities. Thereafter the juice is passed through the first carbonator 2, the filter 3, and the second carbonator 4, after which the liquor is filtered in the filter 5 in a conventional manner.

The initial defecation step, or as it is sometimes called, the clarification step, of the raw sugar juice usually is conducted at a somewhat elevated temperature and thereafter the "thin juice" is cooled to a temperature of below 30° C., and preferably to about 25° C. in a suitable tube cooler bank 6.

Ordinary beet sugar juice as it passes through the steps referred to will have an inorganic or salt content of the order of 0.3 to 0.5 per cent, and an organic non-sugar content equivalent to about 4 to 6 per cent of the sugar content. In such condition the thin juice is relatively impure. The inorganic or salt content has a melassigenic effect which interferes to a somewhat serious extent with the subsequent crystallization, it being generally understood that the ratio of crystallization inhibition of the inorganic salts is about 1 to 3 or 4. That is, one part of the salt content will inhibit the crystallization of 3 to 4 parts of sugar. Additionally, and perhaps more serious, is the presence of the organic non-sugar content. This organic non-sugar content is extremely complex in nature and includes complex colloids. In accordance with the present invention both the melassigenic salts and the complex colloids are removed by a simple series of steps prior to the crystallization of the sugar, so that a high yield is obtained and this yield is of such a purity that the mother liquor or "green syrup" itself may be returned in its entire volume to the process without the necessity of further boilings and separate recovery of sugar therefrom. It further will be noted from the drawing that the step of sulphitation of the thick juice after evaporation is eliminated.

An initial step in the improved process consists of passing the sugar juice from the cooler 6 into a cation exchange bed indicated at 7. In this cation exchange bed is contained a suitable quantity of a granular material having hydrogen exchange properties which act to convert the different salts in the sugar juice to the corresponding free acids. It is preferred that this hydrogen exchange material be a carbonaceous material operating on the hydrogen cycle such as coal which has been treated with concentrated sulfuric acid. Sulfates and chlorides in the raw sugar juice in the form of salts are converted to sulfuric acid and hydrochloric acid, while carbonates and bicarbonates are converted to carbonic acids which may escape from the process in the form of carbon dioxide. Ordinarily approximately one-third to one-fourth of the content of salts may be carbonates, so that this initial step has the advantage of immediately eliminating approximately one-third to one-fourth of the melassigenic inorganic salts from the raw sugar juice.

Many different types of hydrogen ion exchange materials may be employed in the initial step of this process. Practically any organic material when treated with concentrated sulfuric acid will have imparted to it hydrogen exchange properties. Many resins when treated with an acid likewise have hydrogen exchange properties and other resins inherently have hydrogen exchange properties without the previous sulfuric acid treatment.

After filtration of the resulting acidic effluent through a carbon bed 8, if desired, the acidic raw sugar solution is immediately passed through a granular bed of an anion exchange material indicated at 9. This anion exchange material operating on the hydroxyl cycle has the capacity of removing acids from aqueous solutions by adsorption or exchange and the resulting removal of the free acids from the sugar solution completes the elimination of the melassigenic salts from the solution, the completeness of the removal of inorganic materials being dependent upon the effectiveness of the cation and anion exchange materials employed.

In the operation of the cation exchange bed 7 the effluent initially should have a pH of about 2, and the bed preferably is regenerated when the pH of the effluent rises to as much as 3. Thus, the effluent continuously passing from the cation exchanger 7 will have a pH of between 2 and 3 as it enters the anion exchange bed 9. The cation exchange bed 7 periodically is regenerated with a suitable inorganic acid such as hydrochloric or sulfuric acid to restore the initial hydrogen exchange properties of the material and to remove any impurities which have been collected during the operation of the process. Usually the bed is washed with water to eliminate any residual regenerating acid prior to again commencing the filtration of sugar solution therethrough.

The anion exchange material in the bed is an anion active resin, that is, a resin which will remove acids from aqueous solutions by adsorption or exchange. One resin having acid removal properties is described in U. S. Patent No. 2,151,883 to Adams and Holmes, this resin being a meta-phenylene diamineformaldehyde condensation product. Various modifications of this particular type resin are described in the literature. The anion exchange bed periodically is regenerated by treatment with an alkali solution, the bed being washed with water before being put back into the process.

As the sugar solution enters the anion exchange bed it will have a pH of about 2 to 3, and as the process is started the effluent from the anion exchange bed will have a pH of the order of 8 or 9, or sometimes more. In general, the batch of sugar solution passing through the process will have an average pH of the order of 7.5 or more as it is received from the anion exchange bed.

For some reason the anion exchange resin has the property of removing many organic impurities or non-sugars which have survived the previous treatment. It is possible that as the sugar solution passes through the anion exchange resin and has its pH raised, many of the non-sugar colloids pass through their isoelectric points and are precipitated in the bed. However, as such impurities were not precipitated in the cation exchange bed, it is indicated that the anion exchange material has some other effect in the removal of impurities other than a mere change of pH. These organic non-sugars removed by the anion exchange resin include pectic and amino acids as well as other organic and colloidal materials. As before stated, these impurities are extremely complex in nature, as will be seen from an examination of the molasses produced in previously operated processes.

It is apparent from the above that I treat the sugar bearing solution first with a hydrogen exchange material, which has the property of removing positively charged impurities, such as positively charged ions or positively charged colloids, and secondly with an anion exchanger, which has the property of removing negatively charged impurities in the solution. By these two reactions, substantially all impurities are removed from the solution and are replaced by $H^+$ and $OH^-$ ions, which form water. Thus impurities, both positively and negatively charged, are directly eliminated from the solution without imparting objectionable ions to the solution.

The temperature of the sugar solution passing through the cation exchange bed and the anion exchange bed will depend at least to some extent upon the nature of the exchange materials employed. Some of these materials are more heat-resistant than others and where a somewhat resistant material is employed it is preferred to operate the process at as high a temperature as practical.

The thin juice coming from the anion exchanger may have a concentration of about 12° Brix and this thin juice preferably is treated with sulfur dioxide from the sulphitation tank B to reduce the pH of the thin juice to below about 7.5. This sulphitation conditions the thin juice so that it more satisfactorily withstands the subsequent evaporation and avoids the caramelization which otherwise presents a hazard at this stage of the refining process.

After passing through a preheater 10 the thin sugar juice then is sent through a series of evaporators 11 where the juice is boiled down to a crystallization concentration.

Thereafter the thickened juice is passed through a mixing tank 12 and a thick juice filter 13. The filtered juice is then passed into a white sugar vacuum pan 14 where it is further concentrated and crystallized. The crystallized mixture is then passed through a mixer 15 and into a white sugar centrifuge 16 where the sugar crystals are separated. The separated sugar then is discharged into a conveyor 17 which leads to an elevator 18, the sugar being discharged from the latter into a conventional drier 19. After the drying operation the sugar is carried by the conveyor 20 to storage or to a packing room.

The yield in this crystallization operation is substantially greater than has been obtained in the first crystallization of processes known heretofore. Furthermore, the sugar is of very high purity and its complete recovery has required only a single evaporation and crystallization step.

In addition to the high purity of the crystallized and separated sugar, the mother liquo which is separated in the centrifuge likewise is o a very high purity of the order of 98 or mor and it is possible by reason of this high purit and freedom of any substantial quantities of th molasses constituent customarily recovered fron sugar centrifuges, for the mother liquor to be passed through the line 21 back to the mixing tank 12 to be mixed with the incoming filtered juice and again passed into the white sugar vacuum pan. By reason of the high purity of the mother liquor from the centrifuge, the process may be bottled up in this manner for substantial periods without the introduction of unduly great quantities of impurities in the finished product. At certain intervals the mother liquor is passed through the line 22 back to the main process at any convenient point, but preferably ahead of the cation and anion exchange beds.

It will be observed that in the entire operation of the process it is necessary to use but a single crystallizing and centrifugal step, thereby making unnecessary many of the steps heretofore found essential in the efficient recovery of sugar from the raw liquor.

The term "clarification" used herein is substantially synonymous with "defecation", and indicates a solids coagulating or precipitating treatment followed by a solids removal step to separate the solids formed by the coagulating treatment from the juice.

What I claim is:

1. The process of manufacturing sugar from a defecated sugar bearing solution, which comprises treating the solution at a temperature below that at which a substantial amount of inversion occurs with a hydrogen exchange material and thereafter with an acid adsorption material, thereby removing impurities from said solution, concentrating said solution to a supersaturated syrup, crystallizing sugar from said syrup, and mixing the mother liquor from said sugar with additional quantities of said solution being treated.

2. In a process of purifying sucrose sugar juices, an improved method of removing organic impurities from said juices which comprises subjecting a defecated and relatively dilute and cool sugar juice to the action of a hydrogen exchange material, whereby cations are removed from the salts in said juice, and thereby liberating the acids of the salts, and thereafter treating said sugar juice with an acid adsorption resin whereby acidic substances are removed from said juice.

3. In the process of purifying sucrose sugar juices, the improvement which comprises treating a relatively dilute and impure sugar juice with lime at an elevated temperature, separating precipitate from said juice, cooling said juice, then subjecting the so treated juice to the action of a hydrogen exchange material, whereby cations are removed from the salts in said juice, and thereafter treating said sugar juice with an acid adsorption material, whereby acidic substances are removed from said juice.

4. In the process of purifying sugar juices, the improvement which comprises subjecting a defecated and relatively dilute and cool sugar juice to the action of a sufficient amount of hydrogen exchange body to lower the pH of the sugar juice to about 2.0 to 3.0, and then treating said juice with an acid adsorption resin and thereby removing acid from said juice.

5. In the manufacture of sugar, the cyclic process which comprises clarifying an impure and initially dilute sugar solution, then cooling the solution to below about 30° C., then treating the solution with a hydrogen exchange material to convert the salts to the corresponding acids, thereby lowering the pH of the solution to below 3, and thereafter treating the solution with an acid adsorption material, thereby removing acids, concentrating the solution to a supersaturated syrup, crystallizing sugar from said syrup, and returning mother liquor from said sugar to a further portion of the clarified sugar solution.

6. The method of refining a sugar solution which comprises defecating the solution to remove impurities, subjecting the thus clarified solution to the sequential exchange action of a bed of hydrogen exchange material and a bed of acid adsorption material, said sequential exchange action being effected below the temperature at which substantial inversion occurs.

7. A method of purifying a cool and defecated sugar solution which comprises treating the solution with an amount of hydrogen exchange material sufficient to convert salts to the corresponding acids and to lower the pH of the solution below 3, and thereafter treating the solution with an amount of an acid-adsorbing material sufficient to raise the pH of the solution to at least about 7.5.

8. The method of refining a sugar solution which comprises clarifying the solution to remove impurities, subjecting the thus clarified solution to the exchange action of a hydrogen exchange material sufficient to lower the pH of the solution to the range of about 2.0 to about 3.0 and then to the exchange action of an acid adsorption material sufficient to raise the average pH of the solution to at least approximately 7.5, said sequential exchange actions being effected below the temperature at which substantial inversion occurs.

9. A method of purifying an impure sugar bearing solution which comprises the steps of treating the solution with a defecating reagent at an elevated temperature, then clarifying and cooling the solution, thereafter treating the clarified solution with an organic hydrogen exchange material, and thereafter treating said solution with an organic acid adsorption material, said exchange materials being insoluble in dilute acidic sugar bearing solutions.

10. In the treatment of a sugar bearing solution to remove impurities therefrom the steps of defecating the solution at an elevated temperature, cooling the solution, and then subjecting such cooled solution to an organic hydrogen exchanger and to an organic anion exchanger, the hydrogen exchanger being capable of removing positively charged impurities from the solution and causing the solution to become acid, substantially without imparting objectionable ions thereto, and the anion exchanger being capable of removing negatively charged impurities from the solution.

11. The method of refining a defecated sugar bearing solution which comprises treating such solution in the thin state and at a temperature below 30° C., with an insoluble exchange material capable of exchanging hydrogen ions for positively charged impurities in the solution and so rendering the solution acid, and removing acid from such acid solution with an insoluble organic exchange material capable of exchanging hydroxyl ions for negatively charged impurities in the solution.

12. The process of purifying an impure sugar bearing solution, which comprises the steps of clarifying the solution, thereafter cooling the solution to below about 30° C., then passing the solution through a bed of hydrogen exchange material, and thereafter passing said solution through a bed of acid adsorption material to remove impurities from said solution.

13. The process of purifying an impure sugar bearing solution, which comprises the steps of clarifying the solution, then cooling the solution to below about 30° C., then passing the solution through a bed of hydrogen exchange material, and thereafter passing said solution through a bed of acid adsorption resin to remove impurities from said solution.

14. The process of manufacturing sugar, which comprises clarifying an impure and initially dilute sugar solution, thereafter cooling the solution to below about 30° C., then contacting the solution with a hydrogen exchange material, and thereafter contacting said solution with an acid-adsorption material, thereafter concentrating said solution to a supersaturated syrup, subjecting said syrup to a crystallization step, recovering sugar from said syrup, and returning mother liquor from said crystallization step to further quantities of said supersaturated syrup.

HENRY A. VALLEZ.